United States Patent
Haas

(10) Patent No.: US 6,487,480 B2
(45) Date of Patent: Nov. 26, 2002

(54) METHOD OF CALIBRATING OF A SYSTEM WHICH OPERATES DEPENDING ON A SENSOR IN A MOTOR VEHICLE

(75) Inventor: Hardy Haas, Ditzingen-Schoeckingen (DE)

(73) Assignee: Robert Bosch GmbH, STuttgart (DE)

( * ) Notice: Subject to any disclaimer, the term of this patent is extended or adjusted under 35 U.S.C. 154(b) by 0 days.

(21) Appl. No.: 09/812,319

(22) Filed: Mar. 20, 2001

(65) Prior Publication Data
US 2001/0029413 A1 Oct. 11, 2001

(30) Foreign Application Priority Data

Apr. 6, 2000 (DE) .......................................... 100 17 278

(51) Int. Cl.⁷ .............................................. G06F 19/00
(52) U.S. Cl. ........................... 701/29; 701/31; 73/117.2
(58) Field of Search ............................. 701/29, 31, 32, 701/34, 75; 73/117.2, 116

(56) References Cited

FOREIGN PATENT DOCUMENTS

DE 197 53 975 C2 10/1999

*Primary Examiner*—Tan Nguyen
(74) *Attorney, Agent, or Firm*—Michael J. Striker

(57) ABSTRACT

A calibration of a system which operates in dependence on a sensor in a motor vehicle includes testing, with the use of sensors available in a motor vehicle or with the use of data representative of selected conditions or processes or signals of control devices available in the motor vehicle, whether it can be ascertained that nobody is located in a motor vehicle which can influence variables to be determined by a sensor of a system to be calibrated, and performing the calibration when the testing confirms that it can be ascertained that nobody is located in the motor vehicle which can influence variables to be detected by the sensor of the system to be calibrated.

34 Claims, 2 Drawing Sheets

METHOD OF CALIBRATING OF A SYSTEM WHICH OPERATES DEPENDING ON A SENSOR IN A MOTOR VEHICLE

BACKGROUND OF THE INVENTION

The present invention relates to a method of calibration of a system which operates in dependence on a sensor in a motor vehicle.

In a motor vehicle a great number of sensors are provided, for example path sensors, angle sensors, speed sensors, acceleration sensors, pressure sensors, power sensors, etc. These and other sensors are required to provide an optimal control of the components of a motor vehicle, such as the motor, the braking device, the transmission etc., in correspondence with the commands of the driver and the existing conditions.

For an optimal control it is necessary to guarantee that the sensors detect, as accurate as possible, the variables to be detected, with the consideration of what kind of control is performed.

Since all sensors have certain tolerances and/or the results supplied by the sensors often depend not only on the variables to be detected but also on their age and/or application conditions, for example their arrangement, their operational voltage, the degree of dirtying, etc., measures must be taken to eliminate the influences of the above mentioned factors on the results supplied by the sensors.

In accordance with one of these measures, the system which contains the sensors is calibrated during the manufacture and also after mounting in the motor vehicle. However, it can not be guaranteed, in particular for all systems, that they will operate over long times with sufficient accuracy.

In addition, or alternatively to this approach, it is also proposed to construct the sensors so that the occurring offset (zero point displacements) can be compensated automatically in the sensors. Such a sensor is disclosed for example in the German patent document DE 197 53 975. However, not all sensors can be constructed in this way. Moreover, only those offsets can be compensated, whose occurrence has certain causes. It is for example not possible to compensate an offset which is caused by the fact that the sensor is not built-in exactly before the use.

A further possibility for recognition and elimination of the above mentioned affect is that, the variables detected by sensors can be detected by several, differently operating sensors. This however requires high technical and financial expenses.

For the above mentioned reasons, it is a conventional practice to provide in the systems which operate depending on the sensors, a post calibrations within greater or smaller time periods. This can be provided for example during regular maintenance works in the motor vehicle.

However, it is not sufficient for all systems. Some systems must be post-calibrated in shorter time intervals.

This can be achieved for example in that the owner or the driver calibrates the respective systems in accordance with a predetermined specification. This can be also performed substantially automatically so that the owner or the driver must perform himself few simple actions, without extensive knowledge by the owner or the driver.

SUMMARY OF THE INVENTION

Accordingly, it is an object of the present invention to provide method of calibrating of a system which operates depending on a sensor in a motor vehicle, which makes possible, in a simple manner and without participation of the owner or the driver of the vehicle, to guarantee that the system which depends in its operation on the sensors always operates in an orderly fashion.

In keeping with these objects and with others which will become apparent hereinafter, one feature of present invention resides, briefly stated, in a method of calibration of a system which operates depending on a sensor, which includes the steps of first testing, with the use of sensors available in a motor vehicle or with the use of data representative of selected conditions or processes or signals of control devices available in the motor vehicle, whether it can be ascertained that nobody is located in a motor vehicle which can influence variables to be determined by a sensor of a system to be calibrated; and performing the calibration when the testing confirms that it can be ascertained that nobody is located in the motor vehicle which can influence variables to be detected by the sensor of the system to be calibrated.

Then it is ensured that nobody in the motor vehicle is located which can influence the variables detected by the sensor to be calibrated and/or endangered or distorted by a calibration, or in other words for example when nothing is located in the vehicle, the variables to be detected by the sensors to be calibrated have definite values or can be adjusted so that they have definite values. When these values are compared with the results supplied by the sensors, then it is possible to determine whether and sometimes in what range the value supplied by the sensor deviates from the actual value. This difference can be stored in a non-volatile memory, such as for example EEPROM or utilized for correction of the values supplied by the sensor.

When something is located in the vehicle, which has influence on the variables to be detected by the sensor to be calibrated or can apply such influence, or is endangered or distorted by the calibration, it can be verified without or with insignificant expense. For this purpose, however individual available informations must be evaluated. These informations includes for example the following informations:

whether the motor is running;

whether the ignition key is inserted, whether the vehicle doors are closed (determinable by the door switches for the inner illumination)

whether the doors are locked (determinable by the door lock contacts of the central locking), and/or whether somebody is located in the vehicle (determinable by the inner space monitoring through an alarm device and/or by the seat occupying recognition for the air bag control).

Thereby it is possible in an exceptionally simple manner that the senses available in the vehicle can be automatically post-calibrated arbitrarily often and without cooperation of the owner or driver of the motor vehicle.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

The system which must be calibrated in accordance with the inventive method is a control device for an arrangement for hydraulic braking force amplification. However, it is to be understood that the method described hereinbelow can be used for calibration of any other system, for example for calibration of systems for motor control, transmission control, etc.

The steps which are performed during a hydraulic braking force amplification are controlled in the shown embodiment by a control device. The control device is identified herein below as HBA(hydraulic brake amplification) control device.

Figure 1:
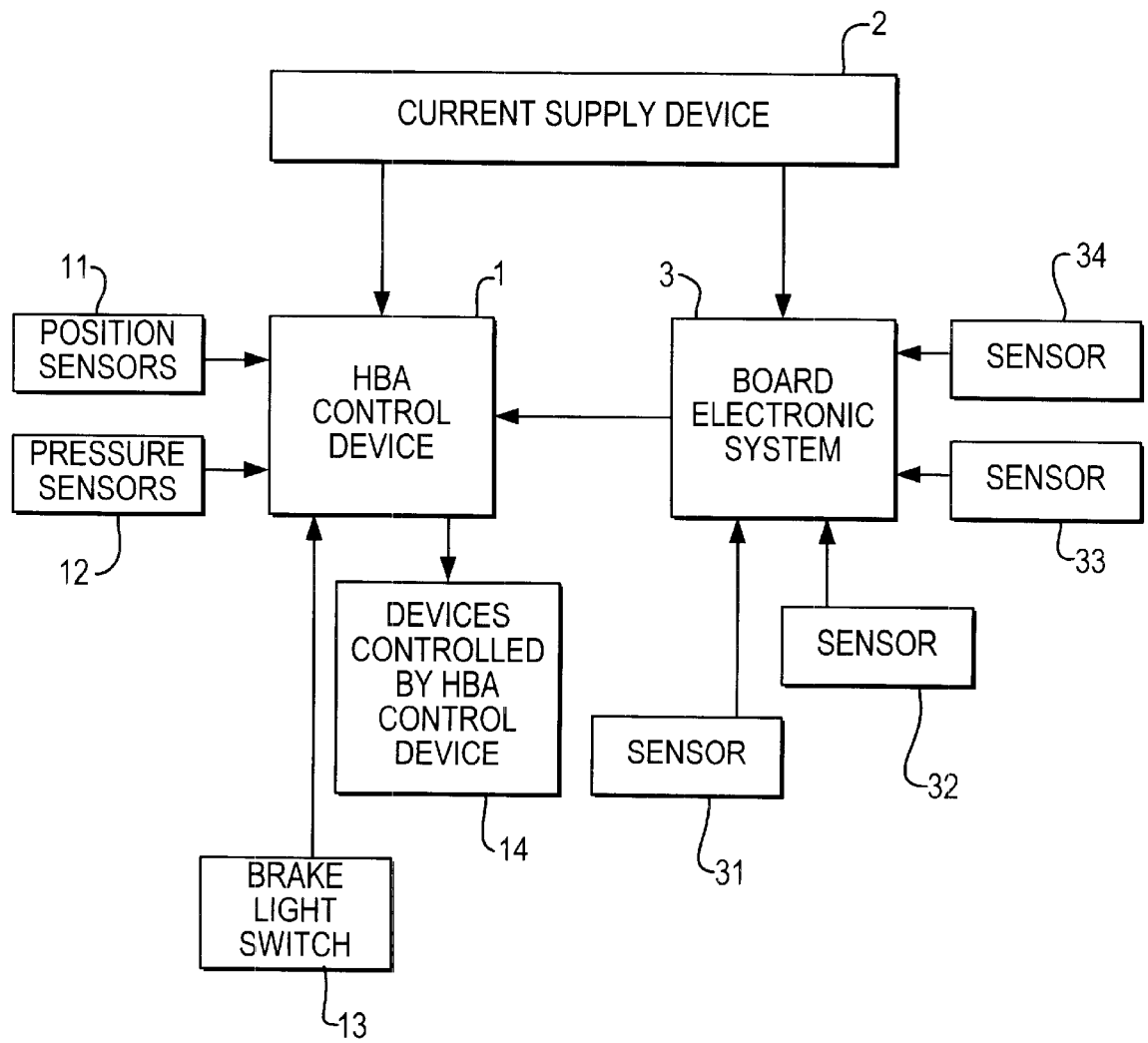
FIG. 1 is a view illustrating a control system for performing calibration in a motor vehicle, depending on at least one sensor.
Figure 2:
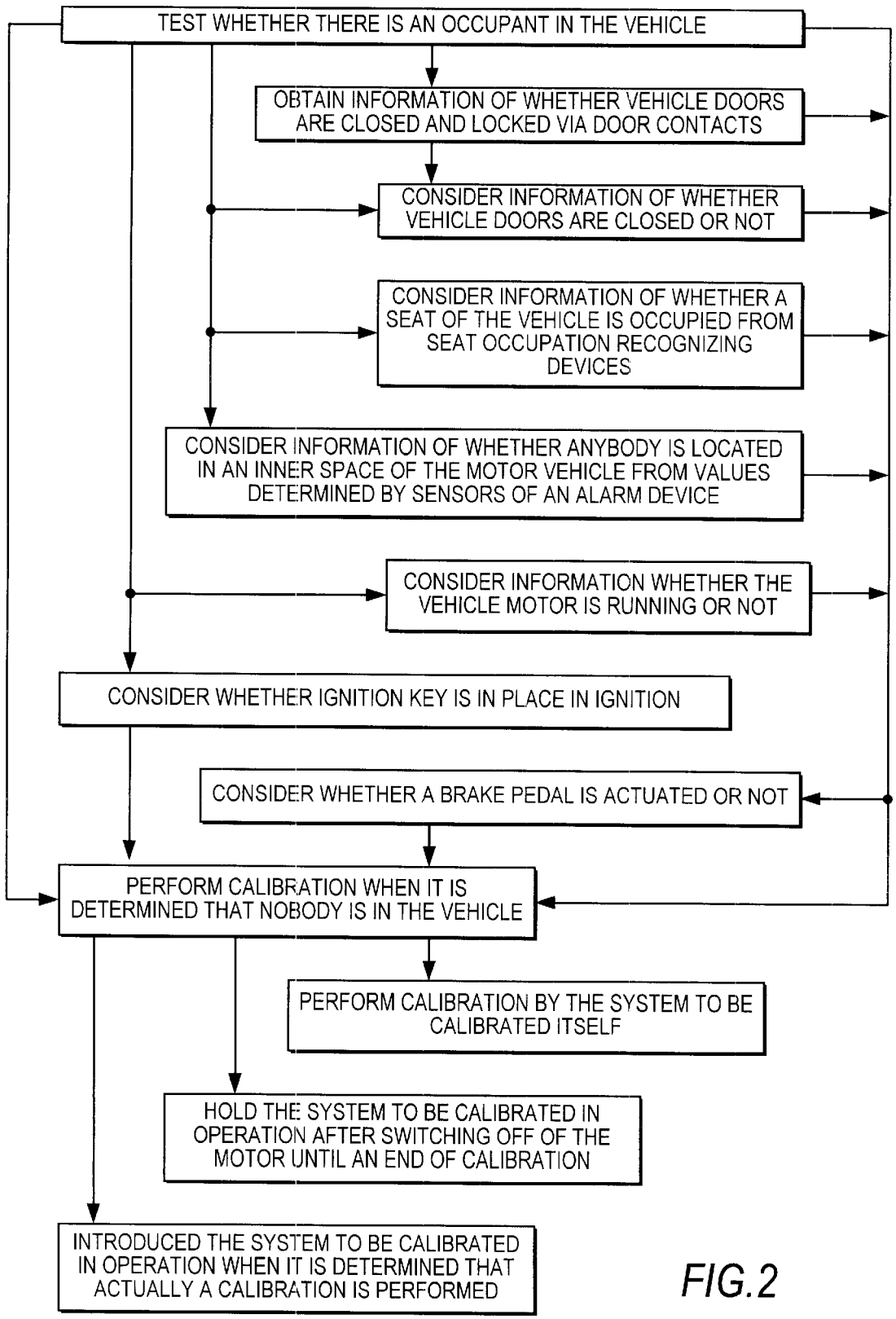
FIG. 2 is a flowchart illustrating the method steps of the invention.

The HBA control device and devices which are connected with it and the method steps are illustrated in FIGS. 1 and 2. The HBA control device is identified with reference numeral 1. It is connected in the shown embodiment with a current supply device 2, a board electronic system 3, position and/or angle sensors 11, pressure sensors 12, a brake light switch 13 and the devices 14 to be controlled by the HBA control device. The current supply device 2 provides energy required for operation of the HBA control device 1, the board electronic system 3, and in some cases further vehicle components, such as for example the motor control device.

The HBA control device 1 is provided for controlling the devices 14 in dependence on the results supplied from the position and/or angle sensors 11, the pressure sensors 12, and the brake light switch 13. The sensors 11, 12 and the brake light switch 13 supply to the HBA control device 1 informations about the driver desire (range of brake pedal actuation and/or speed of the brake pedal actuation and/or acceleration of the brake pedal actuation) and about the variables adjustable by the HBA control device 1 (for example a pressure in the main brake cylinder or in the brake conduits).

The HBA control device 1 of interest is moreover in position to self calibrate. It is additionally connected with the board electronic system 3. The HBA control device obtains informations from the board electronic system 3 and the sensors 31–34 connected with it for determining whether an orderly calibration is possible without endangering or disturbing the vehicle occupants and the vehicle.

The board electronic system 3, as can be recognized from the drawings, includes components of the board electronic system which are in close connection with the body of the vehicle, for example, the electronic system for the inner space illumination, the central locking, the air bag, the alarm device and many others. The board electronic system 3 contains data and/or signals from door contacts 31 (for controlling the inner space illumination), door lock contacts 32 (for controlling the central locking), seat occupation recognition devices 33 for controlling the air bad, and from sensors 34 of an alarm device for monitoring the inner space of the motor vehicle. It transmits to the HBA control device 1 this data and/or other data or signals which represent the conditions or processes.

As mentioned herein above, the HBA control device can be automatically calibrated itself. The event, on which (with provision of further conditions) such a calibration is performed can be any event, for example the switching on of the motor, elapsing of a predetermined time from the last calibration, covering of a predetermined traveling path from the last calibration, reaching of a predetermined number of brake pedal actuations, etc.

With this event (or with any other event), a suitable time point for the calibration is to be expected. The suitable time point in the shown example is considered as reached when it can be determined that nobody is located in the vehicle:

which can influence the variables to be detected by sensors of the HBA control system 1 and/or the variables to be determined by changes performed for calibration purposes by the sensors of the HBA control device 1 are not endangered or distorted.

During the calibrating process under consideration it is first determined whether it can proceed from the fact that nobody is located in the motor vehicle which can apply influence on the variables to be detected by sensors of the HBA control unit 1, and/or it can be started since nobody is located in the motor vehicle which can be endangered or distorted by the changes of the variables to be detected by the sensors of the HBA control device 1 for calibration purposes.

This determination is performed in the shown example with the use of the information supplied to the HBA control device 1 from the board electronic system 3. It should be clarified that from these informations and/or the changes of the same and/or the sequence of the changes of the same, it can be determined whether still somebody is located in the vehicle. For example, it can be started with the determination that nobody is located in the vehicle, when:

the vehicle doors after opening and closing of the same (checked by the door contact 31) are locked (checked by the door lock contact 32), and/or the seat is not occupied (checked by the seat occupant recognizing device 33) and/or no persons are detected in the inner space of the vehicle (checked by the sensors 34 of the alarm device).

This determination can be performed additionally or alternatively with the use of other informations. Such other informations can include the condition of the ignition lock (whether the ignition key is inserted?) or the brake length switch(anyone acts on the brake pedal?)

During the checking it is determined whether it can be concluded that nobody is located in the vehicle, who can apply influence on the variables to be determined by the sensors of the HBA control device 1 and/or the change of the variables to be determined by the sensors of the HBA control device 1 formed for calibration purposes is not endangered or distorted the calibration is started. As explained herein above, the calibration of the HBA control device 1 is performed by itself. It determines now the variables detected by the sensors 11–13 connected to it, compares them with the associated nominal values, and writes the difference or the value which is dependent from the difference in a non-volatile memory such as for example EEPROM. When needed it can be provided that the variables to be determined by the sensors before their determination are brought to the definite values (the nominal value, with which the sensor results are later compared). The values stored in the non volatile memory are later used for correction of the values obtained from the sensors.

When the calibration of the sensors is performed always after a turning off of the motor, the HPA control device is turned on not as conventionally together with the motor, but instead later, exactly after the calibration of the sensors (by ending of the current supply).

Alternatively it can be provided that the HBA control device (with the exception of the important part for the above mentioned testing of the presence of the start beginning) is turned off together with the motor, and then when the calibration is performed is again put in the operation during the time of calibration. Thereby the energy consumption caused by the calibration is relatively low.

With the above described calibration, it can be performed without any cooperation, disturbance or endangering of the owner or driver of the motor vehicle automatically and arbitrarily often.

It will be understood that each of the elements described above, or two or more together, may also find a useful application in other types of methods differing from the types described above.

While the invention has been illustrated and described as embodied in method of calibrating of a system which operates depending on a sensor in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method of calibration of a controlling system of a motor vehicle which operates in dependence on a sensor in the motor vehicle, comprising the steps of first testing whether anybody is located in a motor vehicle which influences variables to be determined by a sensor of a system to be calibrated, whereby the testing is performed using sensors available in the motor vehicle or by using data representative of selected conditions or processes or signals of control devices available in the motor vehicle; and performing the calibration when the testing confirms that nobody is located in the motor vehicle which influences variables to be detected by the sensors of the system to be calibrated.

2. A method as defined in claim 1, wherein said testing includes considering of information of whether doors of the motor vehicles are closed or not.

3. A method as defined in claim 2; and further comprising obtaining the information of whether the doors of the vehicle are closed or not from condition of door contacts provided for controlling an inner space illumination of the motor vehicle.

4. A method as defined in claim 1; and further comprising the testing with consideration of information whether the doors of the vehicle are locked or not.

5. A method as defined in claim 4; and further comprising obtaining the information of whether the doors of the motor vehicle are locked or not from conditions of door lock contacts provided for controlling a central locking of the motor vehicle.

6. A method as defined in claim 1; and further comprising the testing with consideration of informations of whether a seat of the motor vehicle is occupied or not.

7. A method as defined in claim 6; and further comprising obtaining the information of whether the seat of the vehicle is occupied or not from condition of seat occupation recognizing devices for controlling an air bag of the motor vehicle.

8. A method as defined in claim 1; and further comprising performing the testing with consideration of informations of whether anybody is located in an inner space of the motor vehicle or not.

9. A method as defined in claim 8; and further comprising obtaining the information of whether anybody is located in the inner space of the motor vehicle or not from values determined by sensors of an alarm device.

10. A method as defined in claim 1; and further comprising performing the testing with consideration of informations whether a motor of the motor vehicle runs or not.

11. A method as defined in claim 1; and further comprising performing the testing with consideration of informations whether an ignition key is inserted in an ignition key or not.

12. A method as defined in claim 1; and further comprising performing testing with consideration of informations whether a brake pedal is actuated or not.

13. A method as defined in claim 1; and further performing the calibration by the system to be calibrated itself.

14. A method as defined in claim 1; and further comprising holding the system to be calibrated in operation after switching off of the motor until an end of the calibration.

15. A method as defined in claim 1; and further comprising introducing the system to be calibrated in operation when it is determined that actually a calibration is performed.

16. A method as defined in claim 1; and further comprising determining during the calibration a difference between a value detected by the sensor of the system to be calibrated and a nominal value; and storing the difference or a value which is dependent on the difference in a storage.

17. A method as defined in claim 1; and further comprising bringing variables to be detected by a sensor of the system to be calibrated before an evaluation of a value supplied by the sensor to a predetermined value.

18. A method of calibration of a controlling system of a motor vehicle which operates in dependence on a sensor in the motor vehicle, comprising the steps of first testing whether anybody is endangered or distorted by a change of values to be detected by a sensor of the system to be calibrated for calibration purposes, wherein the step of testing is performed using sensors available in the motor vehicle or by using data representative of selected conditions or processes or signals of control devices available in the motor vehicle; and performing the calibration when the testing confirms that nobody is endangered or influenced by changes performed for calibration purposes in variables to be detected by the sensor for said calibration purposes.

19. A method as defined in claim 18, wherein said testing includes considering of information of whether doors of the motor vehicles are closed or not.

20. A method as defined in claim 19; and further comprising obtaining the information of whether the doors of the vehicle are closed or not from condition of door contacts provided for controlling an inner space illumination of the motor vehicle.

21. A method as defined in claim 18; and further comprising the testing with consideration of information whether the doors of the vehicle are locked or not.

22. A method as defined in claim 21; and further comprising obtaining the information of whether the doors of the motor vehicle are blocked or not from conditions of door lock contacts provided for controlling a central locking of the motor vehicle.

23. A method as defined in claim 18; and further comprising the testing with consideration of informations of whether a seat of the motor vehicle is occupied or not.

24. A method as defined in claim 23; and further comprising obtaining the information of whether the seat of the vehicle is occupied or not from condition of seat occupation recognizing devices for controlling an air bag of the motor vehicle.

25. A method as defined in claim 18; and further comprising performing the testing with consideration of informations of whether anybody is located in an inner space of the motor vehicle or not.

26. A method as defined in claim 25; and further comprising obtaining the information of whether anybody is located in the inner space of the motor vehicle or not from values determined by sensors of an alarm device.

27. A method as defined in claim 18; and further comprising performing the testing with consideration of informations whether a motor of the motor vehicle runs or not.

28. A method as defined in claim 18; and further comprising performing the testing with consideration of informations whether an ignition key is inserted in an ignition key or not.

29. A method as defined in claim 18; and further comprising performing testing with consideration of informations whether a brake pedal is actuated or not.

30. A method as defined in claim 18; and further performing the calibration of the system to be calibrated by the system to be calibrated itself.

31. A method as defined in claim 18; and further comprising holding the system to be calibrated in operation after switching off of the motor until an end of the calibration.

32. A method as defined in claim 18; and further comprising introducing the system to be calibrated in operation when it is determined that actually a calibration is performed.

33. A method as defined in claim 18; and further comprising determining during the calibration a difference between a value detected by the sensor of the system to be calibrated and a nominal value; and storing the difference or a value which is dependent on the difference in a storage.

34. A method as defined in claim 18; and further comprising bringing variables to be detected by a sensor of the system to be calibrated before an evaluation of a value supplied by the sensor to a predetermined value.

* * * * *